Nov. 11, 1924.

R. L. JOHNSTON

DECORATIVE PLANT PRODUCT

Filed Jan. 3, 1922

1,515,053

TO A SOURCE
OF ELECTRIC CURRENT

Witnesses:
Martin H. Olsen.
Fred M. Davis.

Inventor:
Richard L. Johnston
By Rummler and Rummler Attys

Patented Nov. 11, 1924.

1,515,053

UNITED STATES PATENT OFFICE.

RICHARD LLOYD JOHNSTON, OF CHICAGO, ILLINOIS, ASSIGNOR TO BERGMAN-KOROPP & CO., INC., OF CHICAGO, ILLINOIS, A CORPORATION OF ILLINOIS.

DECORATIVE PLANT PRODUCT.

Application filed January 3, 1922. Serial No. 526,859.

*To all whom it may concern:*

Be it known that I, RICHARD LLOYD JOHNSTON, a citizen of the United States of America, and a resident of Chicago, county of Cook, and State of Illinois, have invented a new and useful Improvement in Decorative Plant Products, of which the following is a specification.

This invention relates to decorative plant products, and especially to methods and means for displaying the natural form of the plant and enhancing the beauty thereof.

The main objects of this invention are to illuminate the interior of natural plants or plant parts, and especially the flowering parts or seed pods thereof, as for instance, the seed pod of the lotus lily; to provide a simple and effective method and means for accomplishing this purpose; and to so treat and protect the product as to render it permanent for an indefinite period.

An illustrative embodiment of this invention is shown in the accompanying drawings, in which—

Figure 1:
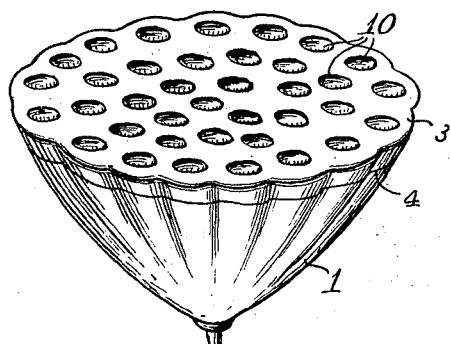
Figure 1 is a perspective view of a finished product in the form of a lotus pod.
Figure 2:
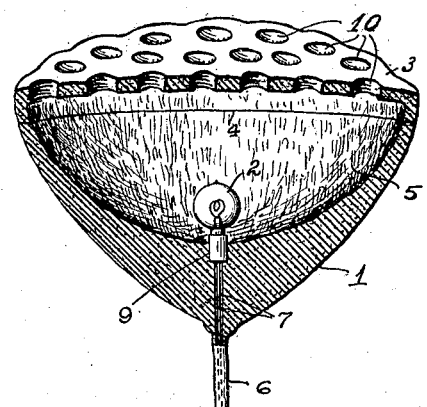
Fig. 2 shows an axial section of a lotus pod equipped with an electric lamp.

In the construction shown in the drawings, the lotus pod 1 is hollowed out and provided with an electric lamp 2 mounted within the cavity. For this purpose, the top part 3 or crown of the pod is cut off as on line 4. The fibrous interior of the pod is then removed to provide the hollow cavity or chamber 5.

Electrical connections for the lamp 2 are concealed and are preferably disposed within the stem 6, which is preferably, but not necessarily, the natural stem of the plant. For this purpose, the conductors are in the form of wires 7 adapted to communicate with any suitable source of electric current, as for instance a battery 8. These wires are connected to the lamp socket 9 which is set in the fibrous base of the pod 1.

After the lamp 2 is installed, the top 3 is replaced in its original position and suitably secured, as for instance, by means of glue or otherwise. The plant parts used are preferably previously treated with a preservative and softening material or materials, so as to add to their durability. The pod or other product may to advantage be artificially decorated by the addition of coloring material.

When the current is turned on, the light from the lamp thoroughly illuminates the pod, the walls of which are largely translucent, and rays of light also escape directly through seed pocket apertures 10. When one (or more) of these illuminated plant parts is placed in a bouquet with other plants or plant parts, it serves very effectively to enhance the decorative appearance of the bouquet as a whole. The illuminated member may also be used separately with good effect in many instances.

Figure 3:
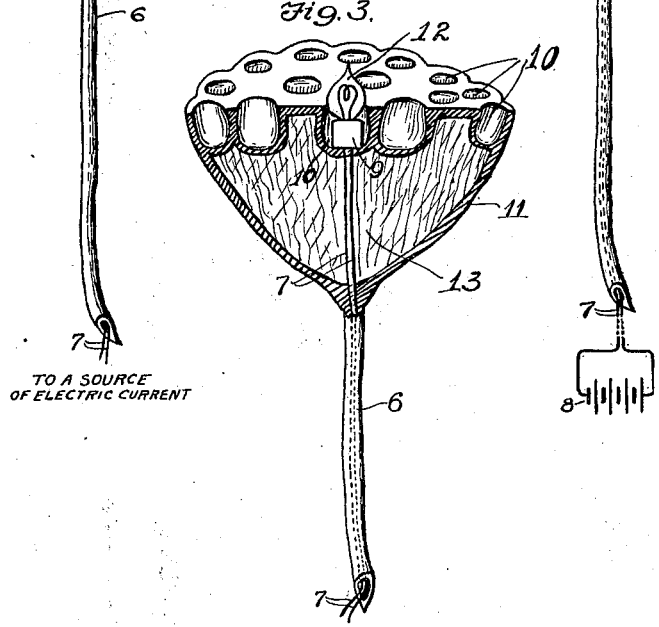
Fig. 3 shows another embodiment.

In the embodiment shown in Fig. 3 the pod 11 simply has a lamp 12 set in one of the seed pockets 10. In this instance the bottom of the pocket is perforated or cut away and electric wires 7 are threaded downward from the lamp base 9 through the fibrous body part 13 to the stem 6.

Although but two specific embodiments of this invention are herein shown and described, it will be understood that numerous details of the constructions shown may be altered or omitted without departing from the spirit of this invention as defined by the following claims.

I claim:

1. The method of producing an ornamental product which consists in cutting open a seed pod mounting an electric lamp therein, supplying current supply leads therefor, and restoring the pod to its natural external structural appearance.

2. The method of treating a lotus pod which consists in cutting off the top, excavating a chamber in said pod, mounting an electric lamp therein and restoring said top.

3. A lotus pod in combination with an electric lamp having its base set therein and means for supplying current thereto.

Signed at Chicago this 29th day of December 1921.

RICHARD LLOYD JOHNSTON.